(12) United States Patent
Deshmukh et al.

(10) Patent No.: US 12,160,061 B2
(45) Date of Patent: Dec. 3, 2024

(54) METAL COMPOSITE FOR USE WITH SEPARABLE ELECTRICAL INTERFACES

(71) Applicant: TE CONNECTIVITY SERVICES GMBH, Schaffhausen (CH)

(72) Inventors: Ranjan Deepak Deshmukh, Middletown, PA (US); David Patrick Orris, Middletown, PA (US); Chad William Morgan, Middletown, PA (US); Rodney Ivan Martens, Middletown, PA (US)

(73) Assignee: TE CONNECTIVITY SOLUTIONS GmbH, Schaffhausen (CH)

( * ) Notice: Subject to any disclaimer, the term of this patent is extended or adjusted under 35 U.S.C. 154(b) by 333 days.

(21) Appl. No.: 17/678,329

(22) Filed: Feb. 23, 2022

(65) Prior Publication Data
US 2023/0268682 A1    Aug. 24, 2023

(51) Int. Cl.
*H01R 13/03* (2006.01)
*H01R 12/57* (2011.01)
*H01R 13/24* (2006.01)

(52) U.S. Cl.
CPC ............ *H01R 13/03* (2013.01); *H01R 12/57* (2013.01); *H01R 13/2442* (2013.01)

(58) Field of Classification Search
CPC .... H01R 13/03; H01R 13/2442; H01R 43/16; H01R 12/57
USPC ................................................. 439/887, 931
See application file for complete search history.

(56) References Cited

U.S. PATENT DOCUMENTS

| | | | | |
|---|---|---|---|---|
| 3,744,128 | A * | 7/1973 | Fisher | H01R 13/6599 174/75 C |
| 6,252,175 | B1 * | 6/2001 | Khandros | H01L 24/11 174/250 |
| 8,690,615 | B2 * | 4/2014 | Sullivan-Malervy | H01R 13/7197 361/311 |
| 9,666,990 | B1 * | 5/2017 | De Boer | H01R 12/79 |
| 9,768,557 | B2 * | 9/2017 | Phillips | H01R 13/6585 |
| 9,972,927 | B2 * | 5/2018 | Nichols | H01R 13/71 |
| 10,050,386 | B1 * | 8/2018 | Pickel | H01R 13/6473 |
| 10,154,595 | B2 * | 12/2018 | Sachs | H05K 3/105 |
| 10,355,420 | B1 * | 7/2019 | Orris | H01R 13/6587 |
| 10,485,149 | B2 * | 11/2019 | Beers | C08K 7/00 |
| 10,686,282 | B1 * | 6/2020 | McCarthy | H01R 13/6471 |
| 10,688,731 | B2 * | 6/2020 | Liu | B29C 65/4855 |
| 2019/0097342 | A1 * | 3/2019 | Leidner | H01R 13/03 |
| 2019/0267736 | A1 * | 8/2019 | Watanabe | H01L 25/04 |
| 2019/0387630 | A1 * | 12/2019 | Belman | H05K 3/3442 |

(Continued)

FOREIGN PATENT DOCUMENTS

| | | | | |
|---|---|---|---|---|
| CN | 108987962 | A * | 12/2018 | ............ H01R 11/11 |
| CN | 109038006 | A * | 12/2018 | |

(Continued)

OTHER PUBLICATIONS

CN-109038006 w/translation (Year: 2018).*
CN-108987962 w/translation (Year: 2018).*
KR-102114175 w/translation (Year: 2020).*

*Primary Examiner* — Marcus E Harcum

(57) ABSTRACT

A separable connector interface includes at least one electrically conductive element with a metal polymer composite deposited thereon. The metal polymer composite has conductive particles dispersed within a protective binder.

18 Claims, 3 Drawing Sheets

(56) References Cited

U.S. PATENT DOCUMENTS

2020/0350708 A1* 11/2020 Hasui ................ H01R 4/023

FOREIGN PATENT DOCUMENTS

| EP | 3185363 A1 | * | 6/2017 | ........... A61B 5/6846 |
| KR | 102114175 B1 | * | 5/2020 | |

* cited by examiner

METAL COMPOSITE FOR USE WITH SEPARABLE ELECTRICAL INTERFACES

FIELD OF THE INVENTION

The present invention relates to a metal polymer composite which is applied to a separable connector interface. In particular, the invention is directed to an electrical connector with electrical contacts consisting of a base metal alloy with optional plated metal layers and a metal polymer composite coating consisting of conductive particles deposited thereon.

BACKGROUND OF THE INVENTION

In known separable connector interfaces, the hard plated finishes or coatings are applied to the contacts or surfaces to provide the required electrical contact resistance, durability, and protection from environmental exposure. However, due to the high hardness of the plated metal finishes, the normal force required to provide for a stable electrical connection upon contact mating is fairly high. The connector mating force is directly proportional to the normal force per contact pin (for example >25 g) and the number of contact pins per connector. For example, microelectronics chip sockets can contain thousands of contact pins, and the collective connector mating force can be very high (sometimes over 100 kg). Therefore, the ability to have contacts and contact interfaces which can provide for a stable and reliable contact resistance, including low level contact resistance (LLCR), at low normal forces (for example <10 g per contact) would be beneficial.

It is therefore desirable to provide a metal polymer composite with relatively low hardness, which is deposited on the separable connector interface or electrical contacts, which allows for the stable and reliable contact resistance to be established even at low normal forces.

SUMMARY OF THE INVENTION

An embodiment is directed to a separable connector interface which has at least one electrically conductive element with a metal polymer composite deposited thereon. The metal polymer composite includes conductive particles dispersed within a base polymer binder.

An embodiment is directed to an electrical connector with at least one electrically conductive contact with a metal polymer composite deposited thereon. The metal polymer composite includes conductive particles dispersed within a base polymer binder.

Other features and advantages of the present invention will be apparent from the following more detailed description of the illustrative embodiment, taken in conjunction with the accompanying drawings which illustrate, by way of example, the principles of the invention.

DETAILED DESCRIPTION OF THE INVENTION

Figure 1:
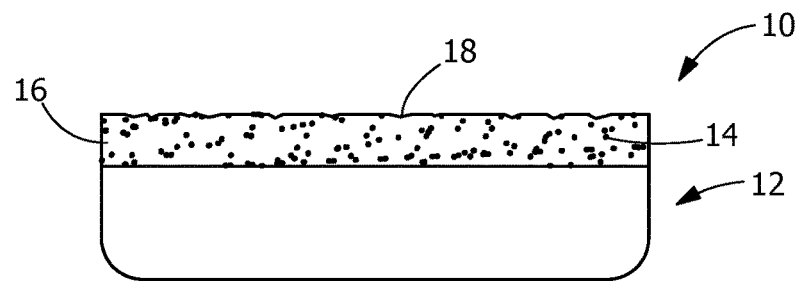
FIG. 1 is a cross-section of a conductive element with a metal polymer composite deposited thereon.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

Moreover, the features and benefits of the invention are illustrated by reference to the preferred embodiments. Accordingly, the invention expressly should not be limited to such embodiments illustrating some possible non-limiting combination of features that may exist alone or in other combinations of features, the scope of the invention being defined by the claims appended hereto.

Figure 7:
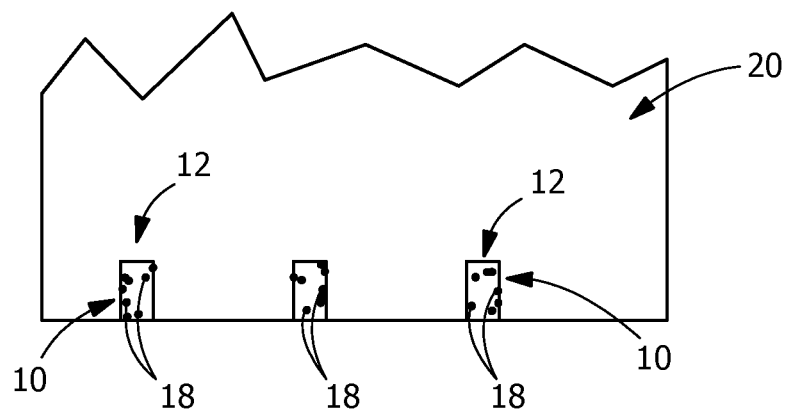
FIG. 7 is a top view of a circuit board with electrically conductive printed circuit board pads with a metal polymer composite deposited thereon.
Figure 8:
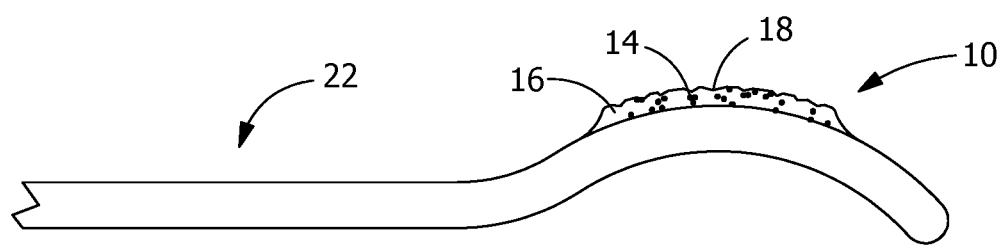
FIG. 8 is a side view of a electrically conductive spring beam with a metal polymer composite deposited thereon.

As shown in FIG. 1, a metal polymer composite 10 is deposited on a conductive element such as a separable connector interface, a printed circuit board 20 (FIG. 7), or a package or mating pad, or an electrical contact member 12 as a coating. The separable connector interface or an electrical contact member 12 may be made of, but not limited to, base metal or metal alloy such as but not limited to: copper or copper alloys, or steel, with optional plated metal layers such as but not limited to nickel, tin or other electrically conducting coatings 15. The electrical contact member may be, but is not limited to, an electrically conductive spring beam 22 (FIG. 8). Any other electrical contact member can be used in the instant invention.

The metal polymer composite 10 has small conductive particles 14 which are dispersed in a protective binder 16. The conductive particles 14 may vary in shape and size, but are generally in the range of a few nanometers to several micrometers in diameter and preferably in the range of 0.2 to 10 μm in diameter. The conductive particles may be, but are not limited to, silver, gold, platinum, palladium, or tin. Other possible variations of the conductive particles include: gold coated on silver particles and flakes; silver coated on copper or nickel particles/flakes; silver alloy particles (examples include silver with palladium, copper, zinc or other elements); mixture with carbon or graphite or other forms of carbon particles with silver; or other metallic particles or their alloys (examples gold, nickel, tin, platinum).

The protective binder 16 includes a polymer or polymer resin. The polymer may be selected from a group consisting of thermoplastic or thermoset resins or a mixture of different polymeric resins. The resins may be rigid or flexible. It is believed that the protective binder in the metal polymer composite 10 binds the electrically conducting particles together in the composite, reduces the overall hardness of the composite, helps to reduce or eliminate adhesive wear or cold welding and reduces the coefficient of friction of the composite during contact mating. Examples of protective binders which are thermoset binders include, but are not limited to: epoxy, acrylate, cyanate esters, polyurethane, phenoxy resin, diallyl phthalate, diallyl isopthallate, silicones, and or a mixture of polymers cured with appropriate curing or cross-linking agents using heat or light. Examples of protective binders which are thermoplastic binder include, but are not limited to: acrylate, acrylic, cellulosic, polyamide, polyimides, polyesters, polyvinyl chloride, polycarbonate, thermoplastic polyurethane (TPU), phenoxy resin, polyether imide, polyethers, and or a mixture of any of the above polymers.

Examples of inks to deposit the metal polymer composite which can be used in the current invention include, but are not limited to:

| Thermoset Epoxy Ag ink composition A: | |
|---|---|
| Silver | 75-85% by weight |
| Diproplylene glycol monomethyl ether | 10-20% by weight |
| Epoxy resin | 5-10% by weight |
| Polymer resin | <1% by weight |
| Curative | <1% by weight |
| When coating is dried, Silver | >89% by weight |
| Thermoset Epoxy Ag ink composition B: | |
| Silver | 65-75% by weight |
| Diluent | 20-30% by weight |
| Epoxy resin | 5-10% by weight |
| Polymer resin | 1-5% by weight |
| Epoxy Curative | <1% by weight |
| When coating is dried, Silver | >89% by weight |
| Flexible thermoplastic resin Ag ink composition C: | |
| Silver | 65-75% by weight |
| Diproplylene glycol monomethyl ether | 20-30% by weight |
| Polymer resin | 5-10% by weight |
| When coating is dried, Silver | >89% by weight |
| Thermoset resin Ag ink composition D: | |
| Silver | 65-75% by weight |
| Diluent | 20-30% by weight |
| Polymer resin | 5-10% by weight |
| Polymer resin | <5% by weight |
| When coating is dried, Silver | >84% by weight |

The metal polymer composite 10 has a relatively low hardness when compared to other conventional electroplated finishes such as soft gold, hard gold (e.g., cobalt hardened), silver, tin, nickel, etc. or electroless finishes such as for example electroless Ni immersion Au (ENIG), electroless nickel electroless palladium immersion gold (ENEPIG), etc. The metal polymer composite 10 can make stable and reliable contact at low normal forces due to higher number of a-spots or asperities 18 (micro-roughness) that can come in contact at a microscopic level allowing for sufficient current flow across the contact mating interface whereas a hard finish may be unreliable due to lower number of contact a-spots or asperities 18 available for current flow at low normal loads.

The metal polymer composite 10 has excellent low level contact resistance (LLCR) stability even at low loads. The LLCR is preferably between approximately 1 mohms to approximately 100 mohms, and more preferably in the range of approximately 1 mohms to approximately 50 mohms, and more preferably in the range of approximately 1 mohms to approximately 20 mohms.

Figure 2:
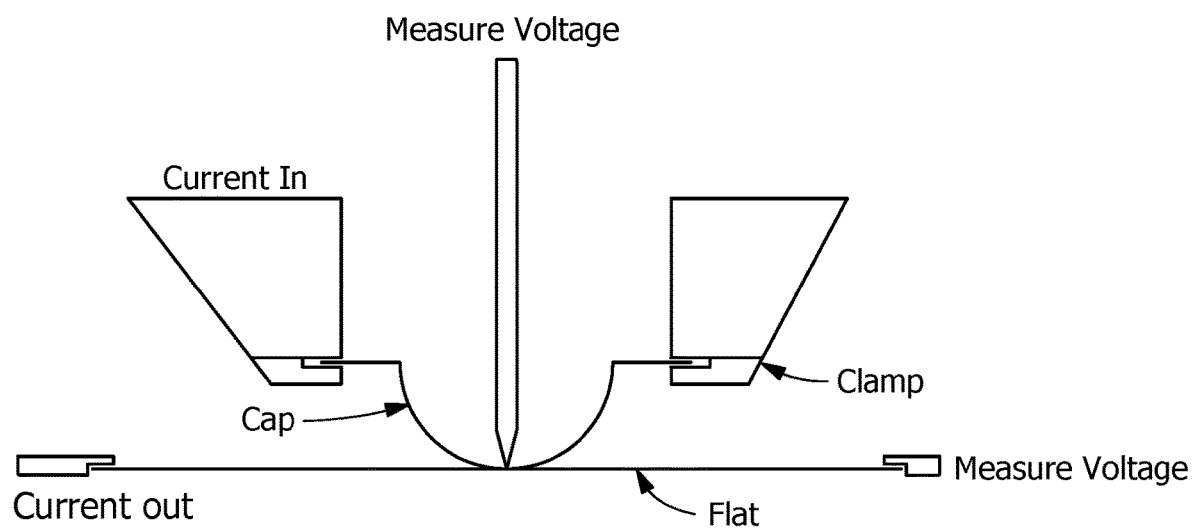
FIG. 2 is a diagrammatic view of the test equipment used to measure the contact resistance.

The LLCR is measured with a contact resistance probe, as shown in FIG. 2. The LLCR measurements was conducted on hemispherical caps mated against flat coupons with different coatings at various load from about 0.5 g to about 5 g normal force. The LLCR was also measured as a function of contact wipe distance.

The LLCR was also measured after environmental aging of flat coupons with metal polymer composite coating. Thermal aging was conducted at 135° C. for 1000 hours. Temperature and humidity testing was done at 85° C. with 85% relative humidity for 1000 hours. The samples were also exposed to EIA-364-65B Mixed flowing gas (MFG), class IIA environment up to 5 days. In some applications the LLCR pass criteria is less than or equal to 10 mohms while for other applications, the LLCR pass criteria can be less than or equal to 20 mohms or 50 mohms or even 100 mohms.

The metal polymer composite 10 can maintain stable and reliable contact under reduced normal force when compared to hard gold plating. The normal forces required for the metal polymer composite 10 is below approximately 20 grams per connection or contact, below approximately 10 grams per connection or contact, or even below approximately 5 grams per connection or contact.

The metal polymer composite 10 can be deposited from a solvent based ink utilizing coating techniques such as, but not limited to, doctor blading, screen printing, gravure printing, flexographic printing, dispense jet printing, pad printing, ink jet printing, and spray coating. The metal polymer composite 10 can be deposited at various thicknesses, including but not limited to a thickness of between approximately 1 μm and approximately 100 μm, with a preferred range of between approximately 10 μm and approximately 50 μm. The deposited metal polymer composite 10 is cured at elevated temperatures for a period of time to control the electrical conductivity of the coating. The curing temperature and time is determined by the particular metal polymer composite 10 and the particular application for which the metal polymer composite 10 is being used. For example, curing temperatures may range from approximately 80° C. to approximately 275° C., and curing times may range for a few seconds up to a few hours.

Figure 3:
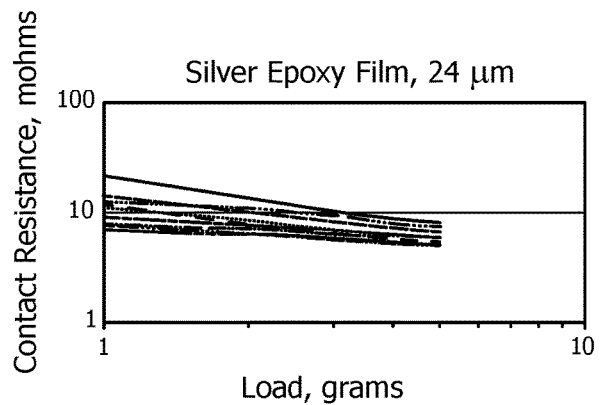
FIG. 3 is a graph showing measurements of the contact resistance of an illustrative metal polymer composite as a function of normal load.
Figure 4:
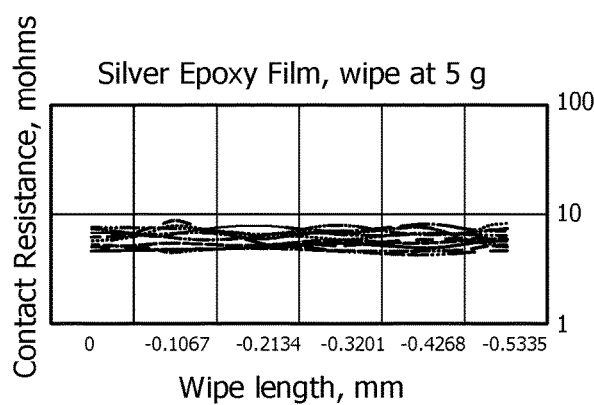
FIG. 4 is a graph showing measurements of the contact resistance of the illustrative metal polymer composite as a function of contact wipe length.
Figure 5:
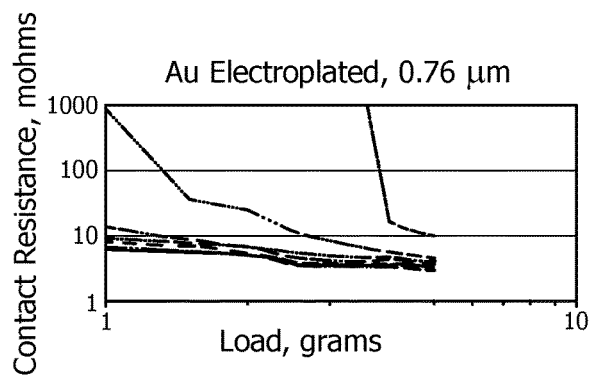
FIG. 5 is a graph showing measurements of the contact resistance of a hard gold plating as a function of normal load.
Figure 6:
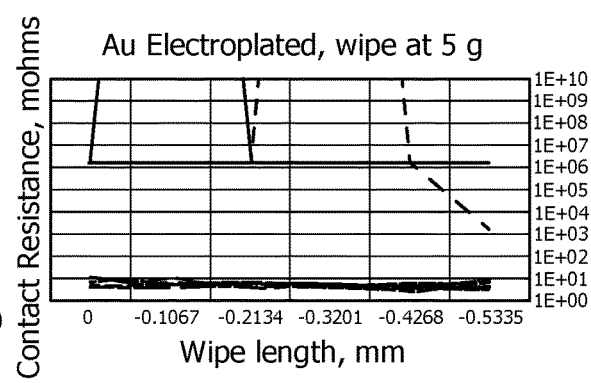
FIG. 6 is a graph showing measurements of the contact resistance of a hard gold plating as a function of contact wipe length.

The contact resistance or LLCR of an illustrative silver epoxy coating applied at a thickness of approximately 24 μm on a 1.5 um thick nickel plated phosphor bronze flat coupon mated vs. a phosphor bronze cap plated with 1.5 um Ni and then with 0.76 um hard Au as a function of load is shown in FIG. 3. The contact resistance of the illustrative silver epoxy coating applied to the above contact as a function of wipe length is shown in FIG. 4. In comparison, the contact resistance of an illustrative hard gold plating applied at a thickness of approximately 0.76 μm on a 1.5 um thick nickel plated phosphor bronze cap mated vs. a flat phosphor bronze coupon with the same plating stack as a function of load is shown in FIG. 5. Also in comparison, the contact resistance of the illustrative hard gold plating applied to the above contact as a function of contact wipe length is shown in FIG.

6. As shown, the illustrative silver epoxy coatings had a consistently better LLCR stability (flat response) for all 9 measurements done up to a 5 gram load, whereas unstable contact resistance or high LLCR was observed for 2 out of 9 measurements for gold control 0.76 µm, showing poor reliability.

Due to presence of the protective binder in the metal polymer composite 10, the diffusion of corrosive gases in the bulk of the composite coating and further diffusion to the substrate is limited, allowing the metal polymer composite 10 to be environmentally stable, even in EIA-364-65B MFG class IIA environments. MFG is mixed flowing gas test where the sample is subjected to a chamber with a mixture of corrosive gases (for example, class IIA: 10 ppb $Cl_2$, 200 ppb $NO_2$, 10 ppb H2S, 100 ppb $SO_2$ at 30° C. and 70% relative humidity) for various times to look for corrosion. The protective polymer binder in the composite also reduces the tarnishing or corrosion of the conductive particles 14 by physically protecting them. As a contrasting example, while silver epoxy composite coating can show good stability in MFG class IIA environments, an electroplated silver layer will heavily corrode due to the formation of silver sulfides and silver chlorides. These corrosion products can make the surface of the silver plating unusable for electrical purposes after such a corrosive environmental exposure.

The presence of a protective binder in the metal polymer composite 10 can reduce or eliminate adhesive wear or cold welding of the conductive particles 14 and can reduce the coefficient of friction. The preferred range of the coefficient of friction is between approximately 0.1 to approximately 1.0. For example, a silver epoxy coating helps to reduce or eliminate adhesive wear or cold welding of silver and has a lower coefficient of friction of approximately 0.46 as compared to a coefficient of friction of greater than 1.0 for a contact electroplated with silver mated vs. another contact electroplated with silver.

The polymer in the metal polymer composite coating reduces tarnishing or corrosion in MFG environments as described earlier. However, the metal particles at the surface of the composite can get exposed upon sliding wear or wipe of the contacts (during mating of the two connector halves) that can cause the removal of the surface polymer layer protecting the particles. The unprotected particles at the surface of the metal polymer composite are thus prone to tarnishing in corrosive environments. In order to provide additional corrosion protection, petroleum and hydrocarbon-based lubricants containing anticorrosion additives can be applied on the surface of the metal polymer composite 10. Lubricants with anti-corrosion additives were found to significantly reduce tarnishing at the surface of the coating compared to lubricants without any anti-corrosion additives. For example, a commercial lubricant ZC 026HT (available from Zip-Chem) was applied on the surface of the silver epoxy coating, subjected to multiple contact mating wipe cycles and then exposed to MFG class IIA environment for 5 days. The coating with the lubricant ZC 026HT showed significant reduction in tarnishing of the surface even within the localized area where contact wipe mark was created. In contrast, samples with a mineral oil lubricant (i.e., without any anti-corrosion additives) showed significant tarnishing within the localized area of the contact wipe mark upon exposure to MFG class IIA environment. However, without contact wipe or wear, all silver epoxy samples showed minimal tarnishing in MFG class IIA environment after 5 days. The above comparative examples show the beneficial effects of lubricant with anti-corrosion additives even with contact wipe or wear. In another variation, the anti-corrosion additives can also be added directly to the ink so that the corrosion additive is embedded in the resulting metal polymer composite coating. For example, anti-corrosion additives such as but not limited to, Calcium sulfonate (for example Calcinate™ OR, available from Lanxess Engineering) or Barium Sulfonate may be provided within the ink to provide for reduced tarnishing. Preferably up to 2 weight percentage and more preferably up to 0.25 weight percentage of the anti-corrosion additive to the base ink composition is added. While increasing the anti-corrosion additive level in the coating improves the anti-tarnish performance, the additive can undesirably reduce the electrical conductivity of the coating. Therefore, optimizing the additive level can be an important consideration.

Other coatings such as for example but not limited to a thin gold layer may be included on the metal polymer composite. In addition, other additives may also be included on the top of the metal polymer composite depending upon the environment that the interface is used in. These coatings or additives are well within the skill of one of ordinary skill in the art.

The metal polymer composite, which can be deposited on a separable connector interface or electrical contact member as a coating, provides for contact resistance stability and reliability, even at low force levels. As a result, the metal polymer composite allows for stable electrical connection to be achieved with lower mating forces (in applications such as high-pin-count microelectronic chip sockets), as the metal polymer composite requires reduced normal forces than standard plated finishes or coatings.

While the invention has been described with reference to a preferred embodiment, it will be understood by those skilled in the art that various changes may be made, and equivalents may be substituted for elements thereof without departing from the spirit and scope of the invention as defined in the accompanying claims. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. A separable connector interface comprising:
   at least one electrically conductive element with a metal polymer composite deposited thereon;
   wherein the metal polymer composite exhibits temperature and humidity stability, the metal polymer composite comprising:
      electrically conductive particles dispersed within a protective binder and has a contact resistance approximately equal to or less than 100 mohms; and
      a surface having a sufficient number of a-spots or asperities due to low hardness of the composite to facilitate a stable electrical connection at normal loads of approximate 10 grams or less.

2. The separable connector interface as recited in claim 1, wherein the separable connector interface is a mating face of an electrical connector and the at least one electrically conductive element are electrically conductive contacts.

3. The separable connector interface as recited in claim 1, wherein the metal polymer composite has a contact resistance approximately equal to or less than 20 mohms.

4. The separable connector interface as recited in claim 1, wherein the protective binder of the metal composite polymer is chosen from the group consisting of thermoset or thermoplastic polymers or mixtures thereof.

5. The separable connector interface as recited in claim 4, wherein the thermoset polymer is chosen from the group consisting of: epoxy, acrylate, cyanate esters, polyurethane, phenoxy resin, diallyl phthalate, diallyl isopthalate, silicones, and or a mixture of polymers cured with appropriate curing or cross-linking agents using heat or light or mixtures thereof.

6. The separable connector interface as recited in claim 4, wherein the thermoplastic polymer is chosen from the group consisting of: acrylate, acrylic, cellulosic, polyamide, polyimides, polyesters, polyvinyl chloride, polycarbonate, thermoplastic polyurethane, phenoxy resin, polyether imide, polyethers, and mixtures thereof.

7. The separable connector interface as recited in claim 1, wherein the at least one electrically conductive element is an electrically conductive spring beam.

8. The separable connector interface as recited in claim 1, wherein the at least one electrically conductive element is an electrically conductive printed circuit board pad.

9. The separable connector interface as recited in claim 1, wherein the metal polymer composite has approximately 65 to 95 percent by weight of electrically conductive particles.

10. The separable connector interface as recited in claim 1, wherein the metal polymer composite has approximately 0.10 to 15 percent by weight of polymer resin.

11. The separable connector interface as recited in claim 5, wherein the metal polymer composite has approximately 0.10 to 15 percent by weight of epoxy resin.

12. An electrical connector comprising:
   at least one electrically conductive contact with a metal polymer composite deposited thereon;
   the metal polymer composite which exhibits temperature and humidity stability comprising:
   electrically conductive particles dispersed within a protective binder;
   a contact resistance approximately equal to or less than 100 mohms; and
   a surface having a sufficient number of a-spots or asperities due to low hardness of the composite to facilitate a stable electrical connection at normal loads of approximate 10 grams or less.

13. The electrical connector as recited in claim 12, wherein the metal polymer composite has a contact resistance approximately equal to or less than 20 mohms.

14. The electrical connector as recited in claim 12, wherein the metal polymer composite has approximately 65 to 95 percent by weight of conductive particles.

15. The electrical connector as recited in claim 14, wherein the conductive particles are silver particles.

16. The separable connector interface as recited in claim 1, wherein the conductive particles are chosen from the group consisting of silver, gold, platinum, palladium, copper, nickel or tin, or mixtures thereof.

17. The electrical connector as recited in claim 12, wherein the conductive particles are chosen from the group consisting of silver, gold, platinum, palladium, copper, nickel or tin, or mixtures thereof.

18. The separable connector interface as recited in claim 1, wherein a lubricant with anticorrosive additives is added to the metal polymer composite.

* * * * *